March 8, 1938. H. J. CRINER 2,110,290
BREAD SLICING MACHINE
Filed Feb. 19, 1937
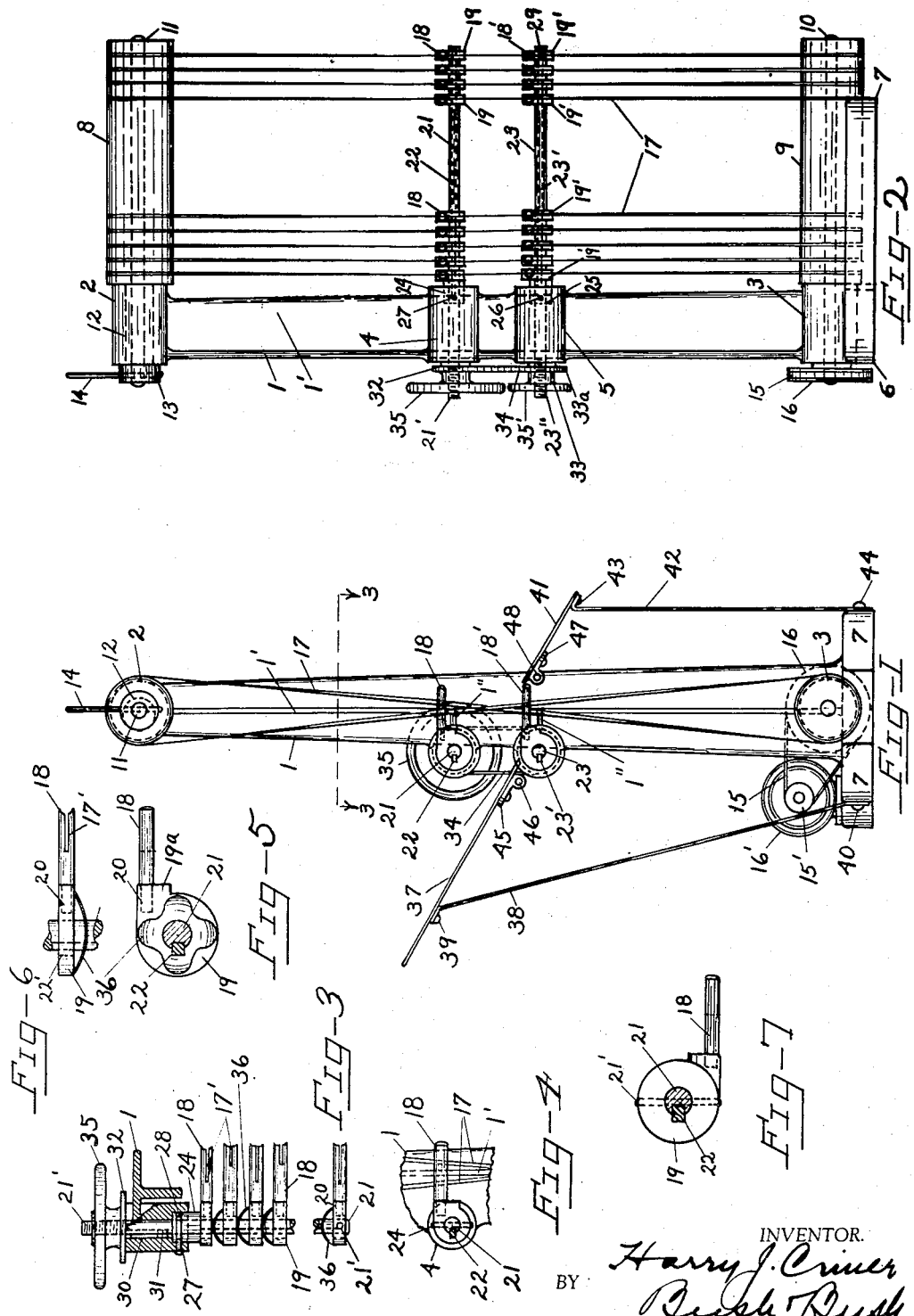
INVENTOR.
Harry J. Criner
BY
ATTORNEYS Patented Mar. 8, 1938

2,110,290

UNITED STATES PATENT OFFICE 2,110,290

BREAD SLICING MACHINE

Harry J. Criner, Davenport, Iowa, assignor of one-half to A. G. Bush, Davenport, Iowa Application February 19, 1937, Serial No. 126,613

11 Claims. (Cl. 146—88)

My invention relates to improvements in bread slicing machines, and while primarily designed for band-blade machines, may be used on the reciprocating type.

The objects of my invention are:

To provide a bread slicing machine having simple and effective means for guiding and gauging the cutting blades and for quickly and easily changing the gauge or spacing of the guides and blades; to provide a simple, easily operated method of varying the gauge of multiple slicing blades; to provide means and a method to automatically space and gauge the slicing blades uniformly; and to provide means and a method for readily changing the gauge of the slicing blades while the machine is in motion, and without stopping the machine nor removing any part of it.

I accomplish these objects by the means illustrated in the accompanying drawing, in which,—

Figure 1 is a side elevation of my machine taken from the right of Figure 2;

Figure 2 is a front elevation of my machine taken from the left of Figure 1, but with a part of the cutting blades and the bread chute omitted;

Figure 3 is an enlarged sectional detail on the line 3—3 of Figure 1, but showing a part of the hub, 4, in section on the middle line thereof and omitting the lower half of the machine;

Figure 4 is an enlarged end view of the upper guide assembly;

Figure 5 is a detail showing the side elevation of one of the guide-supporting members and the spring adjacent thereto;

Figure 6 is an enlarged detail showing a plan view of one of the guide-supporting members and spring;

Figure 7 is an enlarged detail showing an end view of the upper guide assembly in an alternative position in which the guide fingers are located so as to form a guide or detent for the bread while being sliced, to prevent upward displacement thereof.

My invention comprises a frame, 1, preferably formed of cast-iron, having a T-shaped column with web, 1', base, 6, and extended feet, 7, formed integral therewith. An upper hub, 2, is united to or cast integral with the column, 1, and has an eccentric bearing, 12, mounted therein which carries an eccentric casting, 13, in which the shaft, 11, is rigidly secured.

A handle, 14, is united to the casting 13, by which the casting, 13, can be turned in the eccentric bearing so as to raise or lower the shaft, 11, to tighten or loosen the cutting blades. Upon the shaft, 11, is revolvably mounted a resilient cylindrical pulley, 8. A similar hub, 3, is cast integral with or united to the lower end of the frame in which one end of the shaft, 10, is mounted and a drive-wheel, 16, is mounted upon one end of the shaft, 10, which can be actuated by a belt, 15, driven by the drive pulley, 15', of the motor, 16', which may be secured upon the base, 6, by any suitable means.

A resilient cylindrical pulley, 9, is revolvably mounted upon the opposite end of the shaft, 10. Band-blades, 17, which may be crossed in figure 8 form as shown in Figure 1, are mounted upon the cylindrical pulleys, 8 and 9, and travel therewith.

Near the middle of the frame, 1, I form hubs, 4 and 5, which may be cast integral with the web, 1', or secured thereto by an arm or bracket, 1'', or other suitable means.

In the upper hub, 4, I mount rigidly a rod or shaft, 21, which is free to slide lengthwise in the hub, 4, but which is secured against rotation by a key, 30, which is somewhat shorter than the slot, 31, in which it is secured, a corresponding slot being formed in the hub, 4, so as to prevent rotational movement of the key, 30.

Upon the bar or shaft, 21, I mount slidingly a plurality of guide supports, 19, which are substantially annular, but are formed with a tangential hub, 19a, in which the inner end, 20, of a guide finger, 18, is secured by a press-fit or by threading or by other suitable means. The guide finger, 18, has a narrow slot, 17', cut in its outer end to form a guide for a band-blade to travel therein. The fingers, 18, are preferably made of steel hardened to a glasslike hardness, and the outer ends of the fingers, 18, are hollowed along the line of the slot, 17', so as to facilitate entrance of the blades.

The innermost guide-supporting member has a hub, 24, formed integral therewith which extends into a suitable opening formed in the inner end of the hub, 4. A pin, 27, is secured in the hub, 4, the inner end of which extends into a groove, 28, formed in the periphery of the hub, 24, and locks the hub, 24, against movement longitudinally out of the hub, 4.

The outermost supporting member, 19, has a pin, 21', secured therein which passes through the end of the shaft, 21, and locks said supporting member against movement thereon.

Intermediate the inner and outer supporting members, I mount a plurality of similar supporting members upon the shaft, 22, which are separated by cupped springs, 36, which are preferably formed with four bearing points at the periphery thereof as shown in Figure 5, but these springs may be cupped annular plates with a plurality of slots cut into them at intervals in order to facilitate the spring action thereof, or may be made in any desired form.

Both the supporting members, 19, and the intervening springs, 36, are freely slidable longitudinally upon the shaft, 21, but are secured against rotation thereon by a spline or key, 22, which extends longitudinally of the shaft, 21, and is rigidly secured in a suitable slot 22', cut therein. The supporting members, 19, and spring, 36, are slotted to fit and move freely upon the spline, 22. The springs, 36, are formed of substantially the same weight and resistance so that they will exert a uniform pressure upon the successive supporting members, 19, and space them uniformly upon the shaft, 21.

The springs, 36, are made with sufficient strength to move the supporting members, 19, freely upon the shaft, 21, and the supporting members are preferably made of sufficiently light weight and fitted loosely enough upon the shaft, 21, so as to move freely thereon in response to the spring pressure.

A wheel, 35, is threaded upon threads, 21', cut in the end of the shaft, 21, which projects outwardly from the boss, 4, for that purpose.

In order to contract or narrow the gauge of the cutting blades, the wheel, 35, can be revolved so that the thread thereof will exert traction upon the shaft, 21, and draw the shaft to the left as in Figure 2. This will shorten the space between the outermost support, 19, which is fixed to the shaft, 21, and the innermost supporting member, 19, which is pinned to the hub, 4. The contraction of the space will exert pressure upon the springs, 36, and cause them to give. Being of uniform strength, this giving will be substantially uniform and will cause all the supporting fingers, 18, and consequently the cutting blades, 17, to move closer together, thus narrowing the gauge and causing them to cut thinner slices of bread than they would otherwise do.

In order to widen the gauge and allow the machine to cut thicker slices of bread, the wheel, 35, has only to be turned in the opposite direction upon the shaft, 21, when the pressure of the springs, 36, will force the shaft, 21, to the right as illustrated in Figure 2, and widen the spaces between the supporting members, 19, and the fingers, 18, and will thus widen the gauge of the cutting blades causing them to cut thicker slices of bread.

It should be noted that this arrangement will permit any variation desired up to the limits of movement of the shaft as determined by the pins, 21', and the compressibility travel of the springs, 36.

A similar shaft, 23, is mounted in a similar hub, 5, and provided with similar supporting members, 19', which slide longitudinally upon the shaft, 23, and are kept from rotation by a spline, 23'. The end of the shaft, 23, which extends through the hub, 5, is threaded at 23'' and a hub, 33, is threaded upon the end of the shaft, 23, and bears against the end of the hub, 5.

A sprocket wheel, 32, is mounted upon the hub of the wheel, 35, and a similar sprocket wheel, 33a, is mounted upon the hub, 33. A sprocket chain, 34, may be mounted upon the sprocket wheels, 32 and 33a, so as to operate the shafts, 21 and 23, simultaneously at all times and cause the supporting members, 19 and 19', to travel in identical vertical planes.

The inner supporting member, 19', is secured in place by a pin, 26, in the same manner as the corresponding upper supporting member is secured. The outer supporting member, 19', is likewise secured to the end of the shaft or bar, 23, by a pin, 29.

The lower hub, 33, may have a hand wheel, 35', formed integral therewith by which it can be manually turned so that the chain, 34, can be omitted when desired, in which case each set of fingers will be adjusted by the hand wheels independently of the other.

A feed chute, 37, may have its lower end united to the frame, 1, by a suitable bracket, 45, secured to the frame by a bolt, 46, or other suitable means, and the outer portion of the chute may be supported by a brace, 38, which may be in the form of a strap or bar of iron or a plate extending the full width of the machine, and the ends of which may be secured to the feed chute, 37, and foot, 7, respectively, by bolts or rivets 39 and 40.

An off-bearing chute, 41, may be secured to and supported by a bracket, 47, united to the frame by a bolt, 48, and by a bar or plate, 42, united to the chute, 41, by a bolt or rivet, 43, and to one of the feet, 7, by a bolt, 44.

In the operation of my machine, the bands, 17, may be placed over and around the pulleys, 8 and 9, in figure 8 form. The shafts, 21 and 23, are then mounted in their respective hubs, 4 and 5, and the supporting members spaced thereon and secured in the desired position by adjustment of the wheels, 35 and 35'. The blades are placed in the slots, 17', of the fingers, 18 and 18'. The blades are then tightened by operation of the handle, 14, and the machine operated by starting the motor which drives the drive pulley, 16, and the shaft, 15, the upper pulley being driven by traction of the blades passing over same.

When it is desired to cut thinner slices of bread, the gauge of the blades is narrowed by turning the wheels, 35 and 35', upon the shafts, 21 and 23, so as to draw the shafts toward the frame, thus compressing the springs, 36, and bringing the supporting members, 19 and 19', closer together. At the same time the fingers draw the blades closer together. This operation may be performed while the machine is in operation, as well as when it is standing idle. In fact, it is preferable to make the change while the machine is in motion, as that will cause less strain upon the blades.

To widen the spacing or gauge of the machine and cut thicker slices, the operation is reversed. The hand wheels, 35 and 35', are turned in the opposite direction and the springs 36, force the supporting members away from the hubs, 4 and 5, thus spreading the supporting members and widening the gauge of the blades so as to cut thicker slices. A very slight lateral pressure of the fingers, 18, upon the blades, 17, will be sufficient to cause the blades to travel as necessary upon the pulleys, 8 and 9, to conform to the movement of the intermediate portions of the blades.

In practice, it is seldom necessary to have an extreme range of more than one-eighth of an inch and my form of mechanism will readily permit the use of springs having a throw of an eighth of an inch or more so as to provide for ample change of gauge.

When it becomes necessary to replace a blade, it is a simple matter to loosen the blades by turning the handle, 14, and moving the blades along from right to left as necessary and adding the required blades at the right of the machine as shown in Figure 2, or the pins, 21' and 29, may be removed from the ends of the shafts, 21 and 23, and the shafts drawn out through the hubs, 4 and 5, as far as necessary to make the required replacement.

It should be noted that both my method of changing the gauge and the mechanism described, is applicable not only to crossed blades as shown in the drawing, but is also applicable to uncrossed blades such as are shown in the alternative figures in my application for patent, Serial No. 119,936.

I prefer to use the form of guide shown in Figure 7 for the upper guides so that the bread will pass along the lower edge of the fingers, 18, of the upper guide members and be restrained from vertical movement thereby. At the same time, the bread will move along and upon the lower fingers, 18', and be supported thereby while being sliced.

It is obvious that the supporting members may be located either at the front or rear of the cutting blades, but I prefer to locate them at the front of the cutting blades as shown in Figure 1, so that the bread will pass smoothly from the supporting members onto the fingers, 18', and prevent any catching or hesitation of the bread which might occur in case the upper surface of the fingers, 18', was not quite as high as the upper surface of the hub, 19a, of the supporting members.

The guide assemblies above described are designed for use with both band-blade slicing machines and reciprocating bladed machines, although in the case of reciprocating machines, suitable changes will have to be made in the suspension or supports for the blades so as to permit free lateral movement thereof to correspond to the movement of the guides.

Another convenient method for replacing a broken blade is to draw the key, 30, and when the key, 30, is removed, it will permit the shaft, 21, to revolve so that the fingers, 18', may be withdrawn from contact with the blades. The same course may be followed with reference to the shaft, 23.

It is obvious that various modifications of form and position may be made without departing from the spirit of my invention and I do not limit my claims to the precise form of apparatus shown in the drawing nor my method to performance by the precise form of mechanism here shown.

It is likewise obvious that my invention need not be limited to bread slicing machines, but may be applied to machines of various types using a plurality of blades which require adjustable or variable spacing.

I claim:

1. In a multiple bladed bread slicing machine, a blade gauging mechanism comprising a shaft mounted parallel to the plane of travel of the blades, a plurality of slotted guide members slidably mounted upon the shaft adapted to engage, space and guide the blades, compression springs slidably mounted upon the shaft in alternation with the guide members and reversible means for contracting the spacing of the guide members or for allowing the springs to expand the spacing thereof.

2. A multiple band-blade slicing machine comprising a base, a side frame united thereto, upper and lower pulleys revolvably mounted upon the frame at or near the top and bottom thereof, a transverse boss cast integral with the frame intermediate the pulleys, a transverse shaft slidably mounted in the boss and secured against turning therein by a key or other suitable means, a hand-operable wheel threaded upon one end of the shaft adjacent and bearing against the outer end of the boss, a plurality of slotted guide members splined upon the shaft, the outermost member being pinned to the shaft and the innermost member being pinned to the boss, and the intermediate members being slidable lengthwise upon the shaft, compression springs splined upon the shaft and slidable lengthwise thereon being interposed between the successive guide members and adapted to exert uniform pressure thereon in opposite directions, and means for driving the pulleys.

3. In a bread slicing machine having a frame, and a pair of spaced pulleys revolvably mounted thereon with a plurality of band-blades carried or driven by the pulleys, a blade gauging mechanism comprising a transverse shaft slidably mounted in the frame, a plurality of guide members slidably mounted upon the shaft adapted to space and guide the blades, compression springs slidably mounted upon the shaft in alternation with the guide members and adapted to exert pressure upon the adjacent guide members in opposite directions, and means uniting the outermost guide member in fixed position upon the shaft.

4. In combination with a bread slicing machine having a frame and a pair of spaced pulleys revolvably mounted thereon with a plurality of band-blades mounted upon the pulleys, unitary means for spacing and guiding said blades intermediate the pulleys, said means comprising a pair of spaced units each unit containing a plurality of guiding members, resilient means interposed between the guiding members respectively adapted to contract or expand uniformly upon pressure being varied upon the opposed ends of the series.

5. In a bread slicing machine having a frame carrying a pair of spaced pulleys revolvably mounted thereon with a plurality of band-blades carried or driven by the pulleys, a blade gauging mechanism comprising a transverse shaft slidably mounted in the frame intermediate the pulleys parallel to the plane of travel of the blades, a plurality of guide members slidably mounted upon the shaft, the outermost guide member being rigidly united to the shaft and the innermost guide member being fixedly united to the frame, compression springs slidably mounted upon the shaft in alternation with the guide members and adapted to exercise pressure upon the adjacent guide members in opposite directions, a hand wheel threaded upon the shaft with its hub bearing against the frame adapted to draw the shaft inwardly so as to compress the springs.

6. In a bread slicing machine having a frame carrying a pair of spaced pulleys revolvably mounted thereon with a plurality of band-blades carried or driven by the pulleys, a blade gauging mechanism comprising a transverse shaft slidably mounted in the frame intermediate the pulleys parallel to the plane of travel of the blades, a plurality of guide members slidably mounted upon the shaft, the outermost guide member being rigidly united to the shaft and the innermost guide member being fixedly united to the frame, resilient means slidably mounted upon the shaft in alternation with the guide members and adapted to exercise pressure upon the adjacent guide members in opposite directions, a hand wheel threaded upon the shaft with its hub bearing against the frame adapted to draw the shaft inwardly so as to compress the springs.

7. A bread slicing machine comprising the combination of a structure including supporting elements, a plurality of slicing blades supported and actuated by said elements, a transverse bar supported by the structure intermediate the supporting elements, a plurality of guide members slidingly mounted upon said bar corresponding in number to the blades and carrying slotted fingers adapted to receive, space and guide the blades, and means for uniformly drawing together or spreading the guide members upon the shaft.

8. A bread slicing machine comprising the combination of a structure including supporting elements, a plurality of slicing blades supported and actuated by said elements, a transverse bar supported by the structure intermediate the supporting elements, a plurality of guide members slidingly mounted upon said bar corresponding in number to the blades and carrying slotted fingers adapted to receive, space and guide the blades, and means for uniformly narrowing or widening the spacing of the guides upon the shaft.

9. A bread slicing machine comprising the combination of a structure including supporting elements, a plurality of slicing blades supported and actuated by said elements, spaced upper and lower transverse bars supported by the structure intermediate the supporting elements and parallel to the plane of travel of the blades, a plurality of guide members slidingly mounted upon each of said bars corresponding in number to the blades and carrying slotted fingers adapted to receive, space and guide the blades, and means for uniformly drawing together or spreading the guide members upon the shaft.

10. A bread slicing machine comprising the combination of a structure including supporting elements, a plurality of slicing blades supported and actuated by said elements, spaced upper and lower transverse bars supported by the structure intermediate the supporting elements and parallel to the plane of travel of the blades, a plurality of guide members slidingly mounted upon each of said bars corresponding in number to the blades and carrying slotted fingers adapted to receive, space and guide the blades, and means for uniformly drawing together or spreading the guide members upon the shafts, said lower guide members and fingers being adapted to support the bread during the slicing operation and the upper guide members and fingers being adapted to act as a detent to prevent upward displacement of the bread while being sliced.

11. A multiple band-blade slicing machine comprising a base, a side frame united thereto, upper and lower pulleys revolvably mounted upon the shaft at or near the top and bottom thereof, a pair of spaced transverse bosses united to the frame intermediate the pulleys, transverse shafts slidably mounted and keyed in the bosses, manually operable wheels threaded upon the shafts respectively adjacent and bearing against the outer ends of the bosses, a series of slotted guide members splined upon each of the shafts, the outermost guide members being pinned to their respective shafts and the innermost guide members being pinned to their respective bosses and the intermediate guide members being slidable lengthwise upon their respective shafts, compression springs slidably mounted upon the shafts interposed between the successive guide members and adapted to exert uniform pressure thereon in opposite directions, and means for revolving the pulleys.

HARRY J. CRINER.